US012789338B2

(12) United States Patent
Cai et al.

(10) Patent No.: US 12,789,338 B2
(45) Date of Patent: Nov. 10, 2026

(54) NAILING MACHINE

(71) Applicant: TECHTRONIC CORDLESS GP, Anderson, SC (US)

(72) Inventors: Hao Ming Cai, Dongguan City (CN); Hai Ling Lin, Dongguan City (CN); Xi He, Dongguan City (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 19/356,719

(22) Filed: Oct. 13, 2025

(65) Prior Publication Data

US 2026/0102889 A1 Apr. 16, 2026

(30) Foreign Application Priority Data

Oct. 14, 2024 (CN) ........................ 202411432919.8

(51) Int. Cl.
*B25C 1/06* (2006.01)
*B25C 1/04* (2006.01)

(52) U.S. Cl.
CPC .............. *B25C 1/047* (2013.01); *B25C 1/041* (2013.01); *B25C 1/06* (2013.01)

(58) Field of Classification Search
CPC ...................................................... B25C 1/047
USPC ........................................................ 227/156
See application file for complete search history.

(56) References Cited

U.S. PATENT DOCUMENTS 3,809,307 A 5/1974 Wandel et al.
5,356,063 A 10/1994 Perez
5,683,024 A 11/1997 Eminger et al.
5,720,423 A 2/1998 Kondo et al.
5,909,836 A 6/1999 Shkolnikov et al.
6,145,724 A 11/2000 Shkolnikov et al.
6,857,548 B1 2/2005 Clark
(Continued)

FOREIGN PATENT DOCUMENTS

CN 209408409 U 9/2019
CN 209520847 U 10/2019
(Continued)

OTHER PUBLICATIONS

Extended European Search Report for Application No. 25208662.4 dated Jun. 22, 2026 (9 pages).

*Primary Examiner* — Nathaniel C Chukwurah
(74) *Attorney, Agent, or Firm* — Michael Best & Friedrich LLP

(57) ABSTRACT

A nailing machine includes a closed first cylinder having a first working chamber and a second cylinder enclosed outside the first cylinder and having a second working chamber. The first working chamber communicates with the second working chamber. A first piston coupled to a striking pin having a limiting portion is installed inside the first cylinder. The nailing machine also includes a locking mechanism including a locking arm coupled to an upper part of a transmission shaft, and a swing arm coupled to the lower part. A second piston in the second cylinder is driven by a motor assembly to reciprocate. When the second piston is in the first position, the first piston moves inward and the limiting portion is engaged by the locking arm. When the second piston is in the second position, the motor assembly rotates the swing arm, disengaging the locking arm from the limiting portion.

20 Claims, 13 Drawing Sheets

(56) References Cited

U.S. PATENT DOCUMENTS

| | | | |
|---|---|---|---|
| 7,387,227 | B1 | 6/2008 | Jiang et al. |
| 7,588,096 | B2 | 9/2009 | Panasik |
| 8,011,441 | B2 | 9/2011 | Leimbach et al. |
| 8,011,547 | B2 | 9/2011 | Leimbach et al. |
| 8,230,941 | B2 | 7/2012 | Leimbach et al. |
| 8,267,296 | B2 | 9/2012 | Leimbach et al. |
| 8,267,297 | B2 | 9/2012 | Leimbach et al. |
| 8,276,798 | B2 | 10/2012 | Moeller et al. |
| 8,286,722 | B2 | 10/2012 | Leimbach et al. |
| 8,302,832 | B2 | 11/2012 | Porth et al. |
| 8,387,718 | B2 | 3/2013 | Leimbach et al. |
| 8,393,512 | B2 | 3/2013 | Tanimoto et al. |
| 8,561,869 | B2 | 10/2013 | Towfighi |
| 8,602,282 | B2 | 12/2013 | Leimbach et al. |
| 8,763,874 | B2 | 7/2014 | Mccardle et al. |
| 9,676,088 | B2 | 6/2017 | Leimbach et al. |
| 10,046,448 | B2 | 8/2018 | Wolf et al. |
| 10,173,310 | B2 | 1/2019 | Wyler et al. |
| 10,471,579 | B2 * | 11/2019 | Zhang ..................... B25C 1/047 |
| 10,478,954 | B2 | 11/2019 | Leimbach et al. |
| 10,549,412 | B2 | 2/2020 | Mccardle et al. |
| 10,632,600 | B2 | 4/2020 | Pomeroy et al. |
| 10,632,601 | B2 | 4/2020 | Pomeroy et al. |
| 10,710,227 | B2 | 7/2020 | Pomeroy et al. |
| 10,843,317 | B2 | 11/2020 | Sato et al. |
| 11,034,007 | B2 | 6/2021 | Leimbach et al. |
| 11,072,058 | B2 | 7/2021 | Wyler et al. |
| 11,110,578 | B2 | 9/2021 | Li et al. |
| 11,148,268 | B2 | 10/2021 | Zhang |
| 11,241,776 | B2 | 2/2022 | Leimbach et al. |
| 11,345,008 | B2 | 5/2022 | Pomeroy et al. |
| 11,400,573 | B2 | 8/2022 | Tan et al. |
| 11,433,521 | B2 | 9/2022 | Owens et al. |
| 11,433,522 | B2 | 9/2022 | Feng et al. |
| 11,491,624 | B2 | 11/2022 | Mccardle et al. |
| 11,590,638 | B2 | 2/2023 | Sato et al. |
| 11,633,840 | B2 | 4/2023 | Liu et al. |
| 11,633,842 | B2 | 4/2023 | Wyler et al. |
| 11,667,019 | B2 | 6/2023 | Xu |
| 11,679,478 | B2 | 6/2023 | Pomeroy et al. |
| 11,759,930 | B2 * | 9/2023 | Jiang ......................... B25C 1/06 227/8 |
| 11,845,167 | B2 | 12/2023 | Leimbach et al. |
| 11,850,714 | B2 * | 12/2023 | Pomeroy ................. B25C 1/047 |
| 11,890,734 | B2 | 2/2024 | Mccardle et al. |
| 11,904,446 | B2 | 2/2024 | Carrier et al. |
| 11,926,028 | B2 | 3/2024 | Wyler et al. |
| 12,395,046 | B2 | 8/2025 | Pomeroy et al. |
| 2012/0118932 | A1 | 5/2012 | Largo et al. |
| 2013/0037593 | A1 | 2/2013 | Porth et al. |
| 2019/0375084 | A1 | 12/2019 | Bierdeman et al. |
| 2020/0114500 | A1 | 4/2020 | Bierdeman et al. |
| 2020/0238494 | A1 * | 7/2020 | Li ............................. B25C 1/06 |
| 2021/0354276 | A1 | 11/2021 | Zhang |
| 2022/0134525 | A1 | 5/2022 | Bandy et al. |
| 2022/0410357 | A1 | 12/2022 | Owens et al. |
| 2023/0059101 | A1 * | 2/2023 | Jiang ......................... B25C 1/06 |
| 2023/0211483 | A1 | 7/2023 | Sato et al. |
| 2023/0241750 | A1 | 8/2023 | Wyler et al. |
| 2023/0249324 | A1 | 8/2023 | Bierdeman et al. |
| 2023/0264332 | A1 | 8/2023 | Neuhoff et al. |
| 2023/0278177 | A1 | 9/2023 | Julius et al. |
| 2023/0286123 | A1 | 9/2023 | Pomeroy et al. |
| 2023/0390906 | A1 | 12/2023 | Julius et al. |
| 2023/0398670 | A1 | 12/2023 | Liu et al. |
| 2023/0405782 | A1 | 12/2023 | Tsai et al. |
| 2024/0033889 | A1 | 2/2024 | Yan et al. |
| 2024/0100671 | A1 | 3/2024 | Pomeroy et al. |

FOREIGN PATENT DOCUMENTS

| | | | |
|---|---|---|---|
| CN | 210550947 | U | 5/2020 |
| CN | 111300342 | A | 6/2020 |
| CN | 111331557 | A | 6/2020 |
| CN | 212020643 | U | 11/2020 |
| CN | 112677109 | A | 4/2021 |
| CN | 212978188 | U | 4/2021 |
| CN | 113714982 | A | 11/2021 |
| CN | 214643366 | U | 11/2021 |
| CN | 215701434 | U | 2/2022 |
| CN | 116394201 | A | 7/2023 |
| CN | 219806046 | U | 10/2023 |
| CN | 117140436 | A | 12/2023 |
| CN | 117140437 | A | 12/2023 |
| CN | 220279560 | U | 1/2024 |
| CN | 117506813 | A | 2/2024 |
| DE | 202023107664 | U1 | 2/2024 |
| EP | 4414134 | A1 | 8/2024 |
| WO | WO2021232519 | A1 | 11/2021 |
| WO | WO2022156698 | A1 | 7/2022 |
| WO | WO2023160636 | A1 | 8/2023 |
| WO | WO2023250350 | A1 | 12/2023 |

* cited by examiner

NAILING MACHINE

CROSS-REFERENCE TO RELATED APPLICATIONS

This application claims priority under 35 U.S.C. § 119 to Chinese Patent Application Publication No. 202411432919.8, filed Oct. 14, 2024, the entire content of which is incorporated by reference herein.

FIELD

This application belongs to the field of mechanical manufacturing technology and relates to a nailing device, specifically a nailing machine.

BACKGROUND

A nailing machine, commonly known as a nail gun, includes electric nail guns, pneumatic nail guns, gas nail guns, and manual nail guns. The pneumatic nail gun, also referred to as a pneumatic nailing machine, typically utilizes a high-pressure gas generated by an air pump to drive the striking pin within the nailing machine's cylinder to perform a hammering motion, driving nails from the nail strip into an object or firing them out. Generally, the body of the nail gun consists of components such as the gun body, cylinder, balance valve, switch assembly, striking pin assembly, nozzle, and magazine. It utilizes compressed air and atmospheric pressure differences, allowing the trigger switch to facilitate the reciprocating motion of the striking pin within the cylinder. The magazine of the nailing machine comprises components such as the gun head, gun cover, fixed magazine, and movable magazine, which are used to feed nails into the cover slot through compression springs or tension springs, thereby driving the nails out when the striking pin exits the nozzle.

Electric nailing machines can utilize compressed air as power, enabling the striking pin to hit fasteners like nails, among others. To enhance gas storage and ensure that the compressed gas reaches a certain pressure before activating the striking pin to hit the nails, a braking mechanism is generally required on the nailing machine.

Currently available braking mechanisms include a rigid impact braking mechanism associated with a crank arm connected to the motor assembly. However, this type of braking mechanism lacks any buffering effect, leading to rapid wear between the two components under actual high intensity working conditions. This not only results in quick wear and loosening of the connecting parts but could ultimately lead to failure of the braking system, creating severe consequences.

Therefore, there is a need to provide a nailing machine that at least partially addresses the above problems.

SUMMARY

The present disclosure provides, in one aspect, a nailing machine including: a closed first cylinder including a first working chamber, a second cylinder that is enclosed outside the first cylinder, the second cylinder including a second working chamber in communication with the first working chamber; a first piston installed inside the first cylinder; a striking pin fixedly connected to the first piston, the striking pin having a limiting portion; a locking mechanism including a locking arm, a transmission shaft, and a swing arm, where the locking arm is connected to an upper part of the transmission shaft, and the swing arm is connected to a lower part of the transmission shaft, with at least one of the locking arm and the swing arm being connected to the transmission shaft in a manner that allows limited rotation; and a second piston installed within the second cylinder, the second piston driven by a motor assembly to move reciprocally between a first position and a second position, wherein when the second piston is in the first position, the first piston moves inward and is engaged by the locking arm to the limiting portion of the striking pin, and wherein when the second piston is in the second position, the motor assembly drives the swing arm to rotate to a certain angle, subsequently causing the locking arm to disengage from the limiting portion.

The present disclosure provides, in another aspect, a nailing machine, wherein the nailing machine includes a closed first cylinder including a first working chamber; a second cylinder that is enclosed outside the first cylinder, the second cylinder including a second working chamber, the first working chamber of the first cylinder communicating with the second working chamber of the second cylinder; a first piston is installed within the first cylinder, and a striking pin fixedly connected to the first piston, the striking pin including a limiting portion; a locking mechanism including a locking arm, a transmission shaft, and a swing arm, wherein the locking arm is fixedly connected to an upper part of the transmission shaft, and the swing arm is fixedly connected to a lower part of the transmission shaft; a second piston is installed within the second cylinder, which is driven by a motor assembly to move reciprocally between a first position and a second position in the second cylinder; when the second piston is near the first position, the first piston moves inward and is engaged by the locking arm to the limiting portion of the striking pin; when the second piston is near the second position, the motor assembly drives the swing arm, transmission shaft, and locking arm to move away from the striking pin along a direction at an angle to a length direction of the striking pin, thereby causing the locking arm to disengage from the limiting portion; wherein the locking arm is connected to a compressing component, which is capable of making an end of the locking arm abut against a side wall of the striking pin.

The present disclosure provides, in another aspect, a nailing machine including: a first cylinder having a first working chamber; a first piston positioned inside the first cylinder and movable between a first position and a second position; a striking pin fixedly connected to the first piston and having a limiting portion; a locking mechanism including a transmission shaft having an upper part and a lower part, a locking arm coupled to the upper part of the transmission shaft, a swing arm coupled to the lower part of the transmission shaft, and a motor assembly coupled to the swing arm, the motor assembly rotating the swing arm and thereby, the transmission shaft, and the locking arm to disengage the locking arm from the limiting portion.

Figure 1:
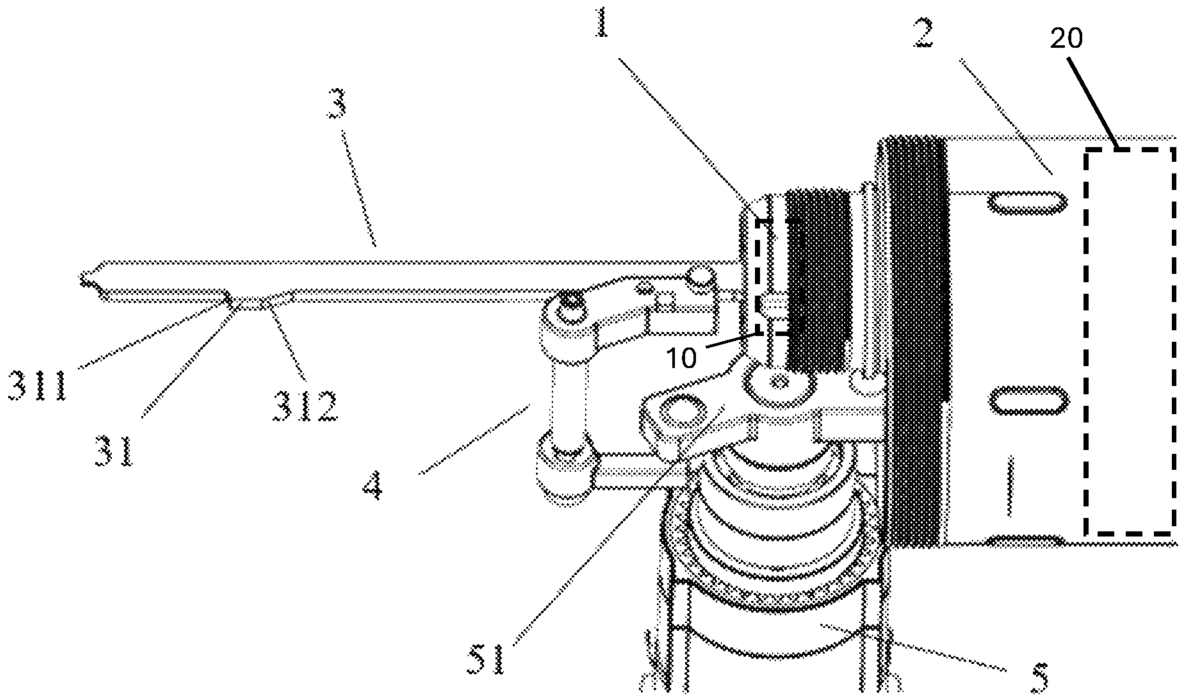
FIG. 1 is a perspective view of the connection structure of the locking mechanism.

Before any embodiments of the subject matter are explained in detail, it is to be understood that the subject matter is not limited in its application to the details of construction and the arrangement of components set forth in the following description or illustrated in the following drawings. The subject matter is capable of other embodiments and of being practiced or of being carried out in various ways. Also, it is to be understood that the phraseology and terminology used herein is for the purpose of description and should not be regarded as limiting.

DETAILED DESCRIPTION

Now, with reference to the drawings, the specific embodiments of this application will be described in detail. The descriptions provided here are merely based on the preferred embodiments of the aspects of this application, and those skilled in the art may conceive other ways to achieve these aspects based on the preferred embodiments, which also fall within the scope of this application. In some embodiments, certain technical features that are well-known in the art have not been described to avoid confusion.

Unless otherwise defined, all technical and scientific terms used in this application have meanings commonly understood by those skilled in the art. In the event of any conflict, the definitions provided in this application shall prevail. Below, only exemplary methods and materials are described. Similar or equivalent methods and materials may also be used in experiments or tests for this application. The materials, methods, and examples disclosed in this application are illustrative and are not intended to be limiting.

For the description of numerical ranges in this application, it is explicitly intended that each integer within the range has the same level of precision. For example, for the range of 6 to 9, integers 7 and 8 are explicitly contemplated in addition to 6 and 9, and for the range of 6.0 to 7.0, the numbers 6.0, 6.1, 6.2, 6.3, 6.4, 6.5, 6.6, 6.7, 6.8, 6.9, and 7.0 are expressly intended.

FIG. 1 to FIG. 13 illustrate the nailing machine as described in this application. It should first be noted that directional and positional terms in this application are to be understood as relative directions and positions, rather than absolute directions and positions. The directional and positional terms in this application can be interpreted with reference to the exemplary structures shown in FIG. 1 to FIG. 13.

Currently existing braking mechanisms, wherein the crank arm connected to the motor assembly affects the braking mechanism rigidly, do not provide any cushioning effect. In actual high intensity working conditions, this can not only lead to rapid wear between the two components but also cause swift wear and loosening between various connecting parts of the braking mechanism, ultimately resulting in serious consequences such as brake failure.

This application provides a nailing machine that can partially address the aforementioned issues.

With reference to FIG. 1 to FIG. 8, a preferred embodiment of the nailing machine according to this application comprises the following structure:

A closed first cylinder (1) and a second cylinder (2) arranged outside the first cylinder (1), wherein the working chamber of the first cylinder (1) is interconnected with the working chamber of the second cylinder (2); the first cylinder (1) is equipped with a first piston (10) that is fixedly connected to a striking pin (3), which has a limiting portion (31);

The nailing machine further includes a locking mechanism (4), which consists of a locking arm (41), a transmission shaft (42), and a swing arm (43). The locking arm (41) is connected to the upper part of the transmission shaft (42), while the swing arm (43) is connected to the lower part of the transmission shaft (42). At least one of the locking arm (41) and the swing arm (43) can be connected to the transmission shaft (42) in a manner that allows limited rotation (for example, the locking arm (41) may be elastically and rotationally connected to the upper part of the transmission shaft (42), while the swing arm (43) is fixedly connected to the lower part of the transmission shaft (42); or the locking arm (41) is fixedly connected to the upper part of the transmission shaft (42), while the swing arm (43) is elastically and rotationally connected to the lower part of the transmission shaft (42); or both the locking arm (41) and the swing arm (43) are elastically and rotationally connected to their respective positions on the transmission shaft (42));

Inside the second cylinder (2), there is a second piston (20) driven by the motor assembly (5) to reciprocate between a first position and a second position within the second cylinder (2); when the second piston (20) is near the first position, the first piston (10) moves inward and is captured by the locking arm (41) engaging with the limiting portion (31) of the striking pin (3). When the second piston (20) is near the second position, the motor assembly (5) drives the swing arm (43) to rotate at a certain angle, which then causes the locking arm (41) to disengage from the limiting portion (31).

The working principle of the nailing machine described in this application is as follows: The motor assembly (5) drives the second piston (20) to reciprocate within the second cylinder (2), allowing the second piston (20) to reach two extreme points, namely the first position and the second position. When the second piston (20) approaches the first position, a negative pressure is generated within the second cylinder (2). Since the first cylinder (1) is connected to the second cylinder (2), this creates suction on the first piston (10), causing it to move inward, and the striking pin (3) simultaneously retracts into the first cylinder (1). After the first piston (10) reaches its extreme position (or close to it), the locking arm (41) engages with the limiting portion (31) of the striking pin (3), restricting the movement of the striking pin (3). Subsequently, the motor assembly (5) drives the second piston (20) for the next stroke, moving the second piston (20) towards the second position. High-pressure gas is generated within both the first and second cylinders (1, 2).

Because the first piston (10) and the striking pin (3) are constrained by the locking arm (41) and the limiting portion (31), they remain stationary. Once the second piston (20) approaches the second position, the motor assembly (5) continues to operate, triggering the locking mechanism (4) so that the locking arm (41) disengages from the limiting portion (31). Under the push of the high-pressure gas, the striking pin (3) is rapidly and forcefully ejected along with the first piston (10).

The locking mechanism (4) in this application utilizes at least one of the locking arm (41) and the swing arm (43) connected to the transmission shaft (42) in a manner that allows limited rotation, providing a certain cushioning effect to reduce rapid wear and loosening issues between the connecting components.

Figure 4:
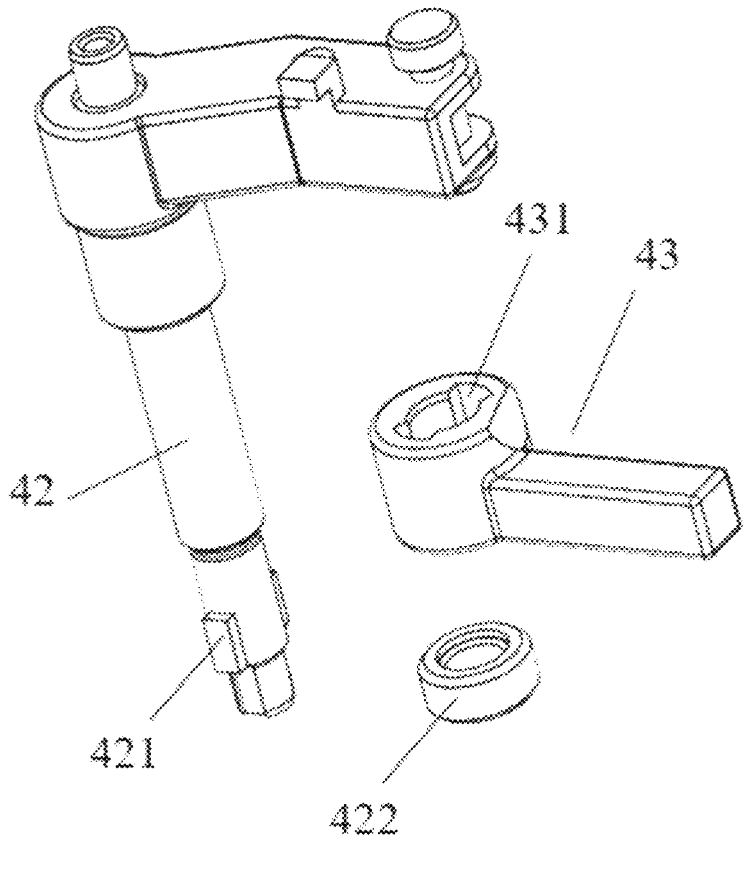
FIG. 4 is an exploded perspective view of the locking mechanism of FIG. 1.
Figure 5:
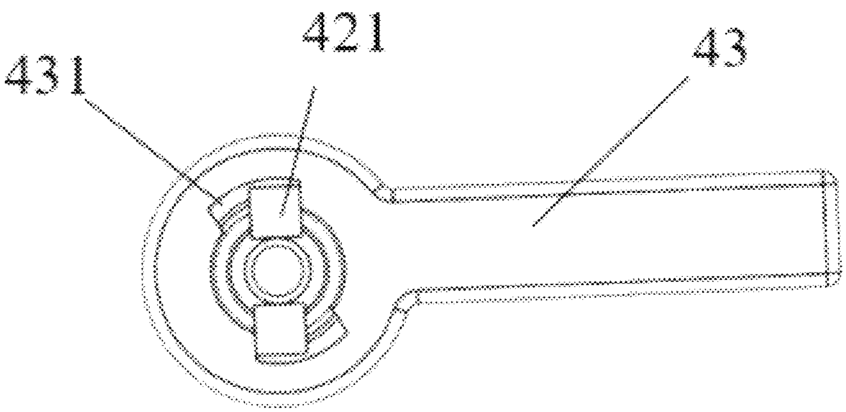
FIG. 5 is a bottom view of the locking mechanism of FIG. 1.

Referring to FIG. 4 to FIG. 5, as a preferred embodiment, the swing arm (43) is elastically and rotatably connected to the lower part of the transmission shaft (42). In this case, the lower part of the transmission shaft (42) has a protruding key (421), and the swing arm (43) includes a key groove (431) that accommodates the key (421). The size of the key groove (431) is larger than that of the key (421), allowing the key (421) to rotate at a certain angle within the key groove (431). To achieve a better cushioning effect, this angle ranges from 5 degrees to 30 degrees, preferably from 5 degrees to 20 degrees, and further preferably 10 degrees.

As another preferred embodiment, the locking arm (41) is elastically and rotatably connected to the upper part of the transmission shaft (42). At this time, the upper part of the transmission shaft (42) has a protruding key (421), and the locking arm (41) features a key groove (431) that accommodates the key (421). The size of the key groove (431) exceeds that of the key (421), allowing the key (421) to rotate at a designated angle within the key groove (431). For optimal cushioning effect, this angle also ranges from 5 degrees to 30 degrees, preferably from 5 degrees to 20 degrees, and further preferably 10 degrees.

As another preferred embodiment, the locking arm (41) is elastically and rotatably connected to the upper part of the transmission shaft (42), while the swing arm (43) is elastically and rotatably connected to the lower part of the transmission shaft (42). In this case, both the upper and lower parts of the transmission shaft (42) are equipped with protruding keys (421).

The locking arm (41) and the swing arm (43) each have key grooves (431) that accommodate the keys (421), and the size of the key grooves (431) is larger than that of the keys (421), allowing the keys (421) to rotate at a certain angle within the key grooves (431). To achieve a better cushioning effect, the sum of the angles through which the locking arm (41) and the swing arm (43) can rotate is between 5 degrees and 30 degrees, preferably between 5 degrees and 20 degrees, and more preferably 10 degrees.

In the aforementioned nailing machine, the upper and/or lower parts of the transmission shaft (42) are equipped with at least one key (421). For example, there can be 1 to 4 keys (421). To ensure the strength of the transmission shaft (42), it is preferable to have 2 to 3 keys (421), and more preferably 2 keys (421). When there are 2 to 4 keys (421), all keys (421) are symmetrically arranged around the transmission shaft (42). As a non-limiting example, the keys (421) can be integrally formed with the transmission shaft (42).

Figure 6:
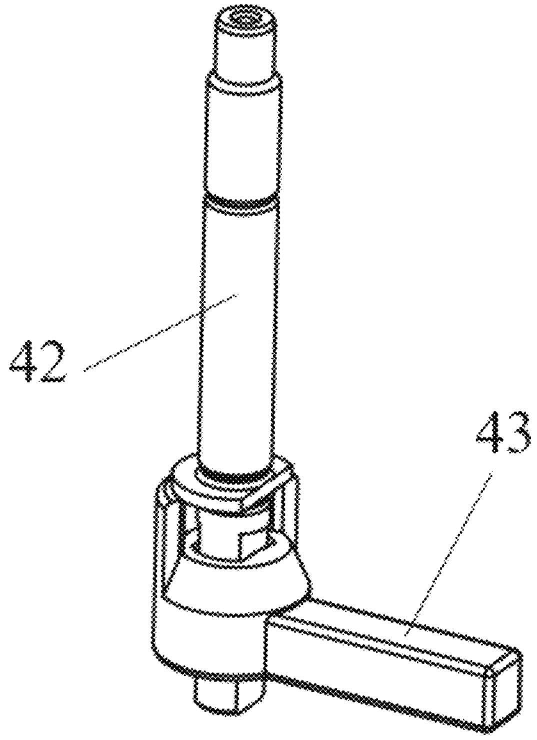
FIG. 6 is a perspective view of another locking mechanism.
Figure 7:
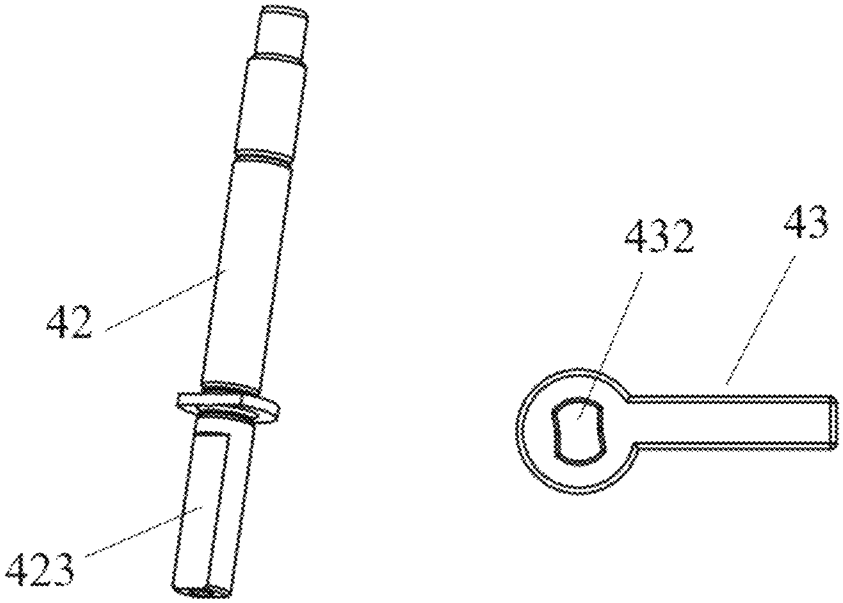
FIG. 7 is an exploded view of the locking mechanism of FIG. 6.

Referring to FIG. 6 to FIG. 7, as another alternative preferred embodiment, the protruding keys (421) can be replaced by flat portions (423) on the transmission shaft (42), while the key grooves (431) can be replaced by flat grooves (432). As a non-limiting example, the flat portion (423) can be machined from the upper or lower part of the transmission shaft (42).

As shown in FIG. 4, furthermore, to ensure good fitting and fixation between the swing arm (43) and the transmission shaft (42), the lower part of the transmission shaft (42) limits the axial movement of the swing arm (43) via a sleeve (422). Here, the swing arm (43) is not fixed to the transmission shaft (42), but can slide or rotate on the transmission shaft, with the sliding distance limited by the distance between the transmission shaft (42) and the sleeve (422), while the sleeve (422) is press-fitted onto the housing (7).

Figure 2:
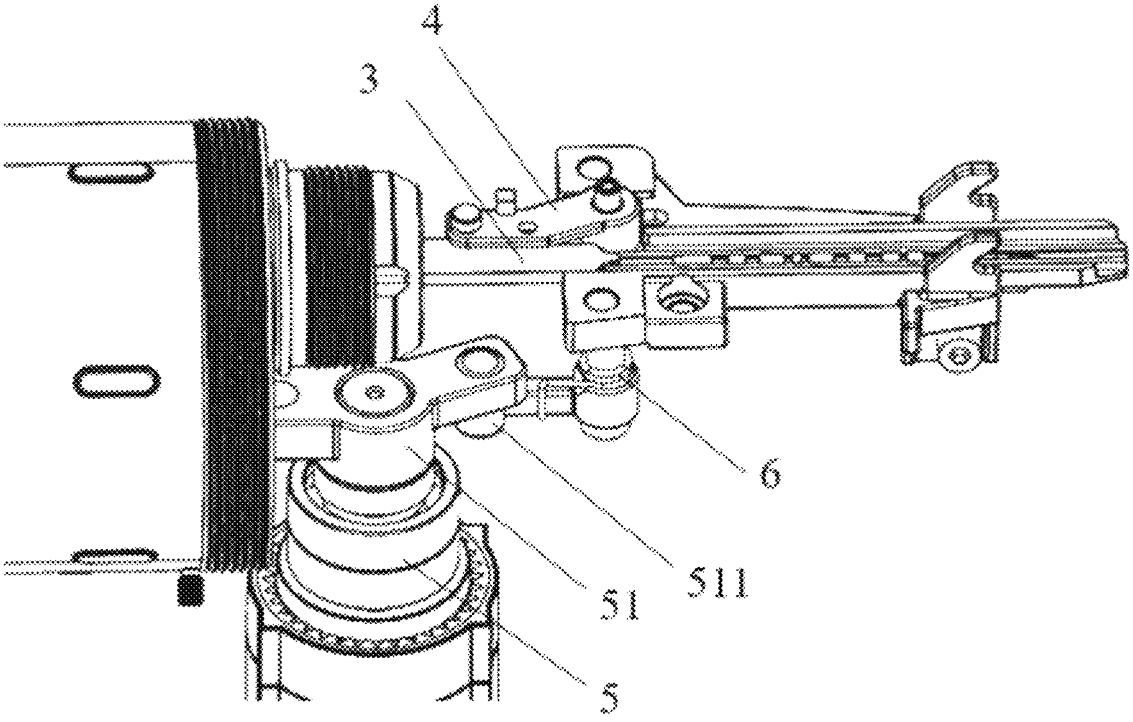
FIG. 2 is a perspective view of the connection structure of the locking mechanism of FIG. 1.
Figure 8:
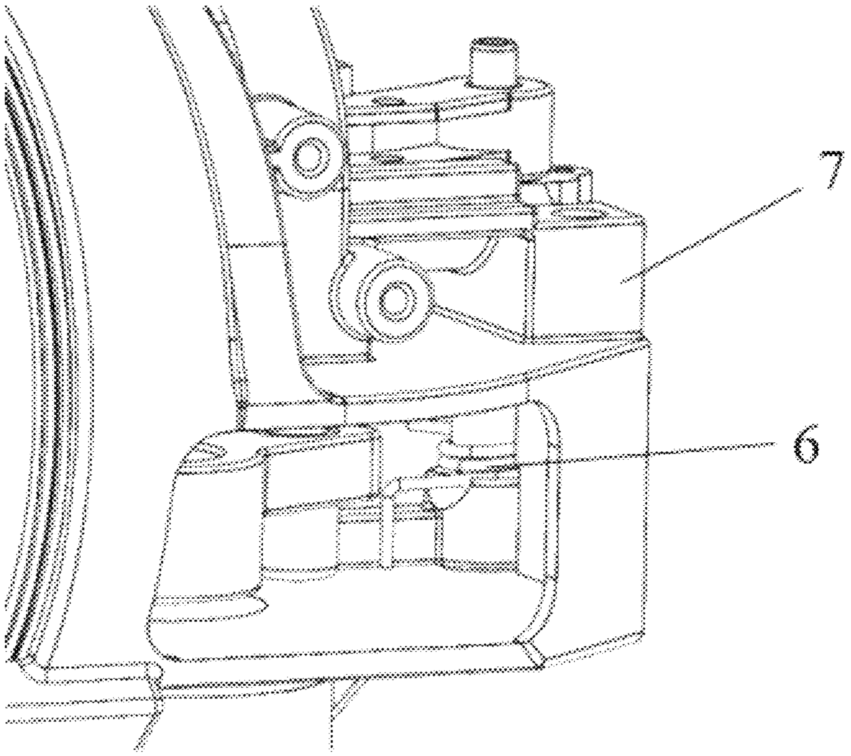
FIG. 8 is a perspective view of the connection structure of the locking mechanism.

Referring to FIG. 2 and FIG. 8, as a preferred embodiment, an elastic element (6) is connected to the swing arm (43). This elastic element (6) can apply pressure to the swing arm (43) and then transmit this pressure through the transmission shaft (42) to the locking arm (41) so that the end of the locking arm (41) rests against the side wall of the striking pin (3). The specific position of the elastic element (6) is not limited, provided it achieves the above effect. As a preferred embodiment, the nailing machine further includes a housing (7), where the elastic element (6) is placed within the housing (7). The specific structure and material of the elastic element (6) are not limited, as long as they achieve the desired effect. As a preferred embodiment, the elastic element (6) is a torsion spring.

As shown in FIG. 5, as a preferred embodiment, the swing arm (43) is positioned at the initial position due to the torque from the elastic element (6). When the swing arm (43) rotates, the transmission shaft (42) does not immediately rotate because there is a gap between the swing arm (43) and the key (421) (or flat portion (423)). Only when the swing arm (43) moves to a specific position will the transmission shaft (42) also rotate. In addition, due to the action of the elastic element (6), a certain cushioning effect can be achieved. As another preferred embodiment, when the locking arm (41) is connected with an elastic element (6), its working principle is similar to that of the first preferred embodiment, where the elastic element (6) can also provide a certain cushioning effect.

Figure 3:
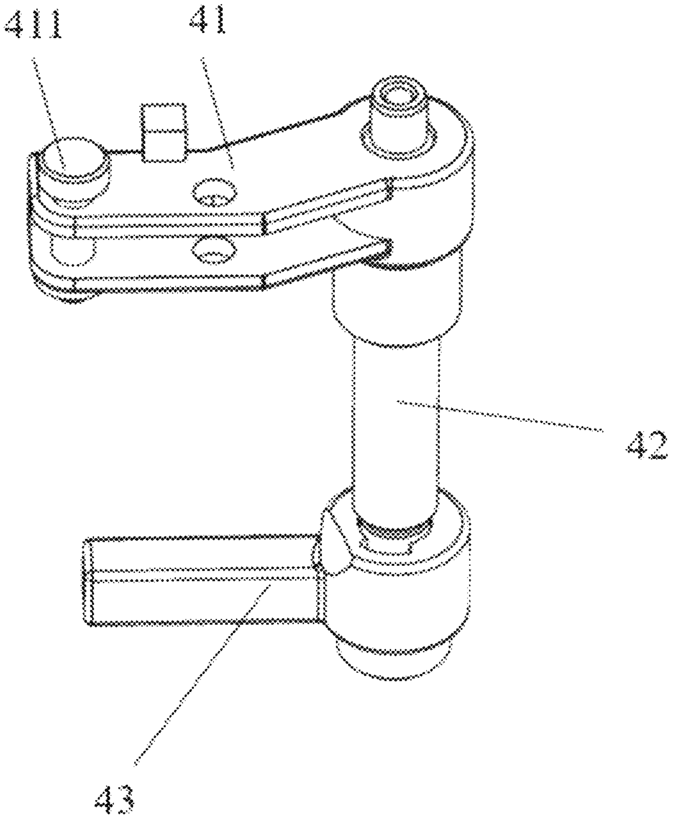
FIG. 3 is a perspective view of the locking mechanism of FIG. 1.

Referring to FIG. 3, in a preferred embodiment, the end of the locking arm (41) is equipped with a locking pin (411) intended for engaging with the limit section (31) of the striking pin (3). As a further preferred embodiment, the locking arm (41) is configured as a double-layer structure that can accommodate the side wall of the striking pin (3). This design can enhance the structural stability of the locking arm (41) while increasing stability with respect to the striking pin (3).

Continuing to refer to FIG. 1, in one embodiment, the striking pin (3) is an elongated plate body, and the limit section (31) is a projection formed on the side wall of the striking pin (3). The side wall of the projection includes a contact surface (311) and a transition surface (312), where the contact surface (311) is perpendicular or forms a certain angle with the length direction of the striking pin (3), and the transition surface (312) extends from the side wall of the striking pin (3) to the contact surface (311). In another embodiment (not illustrated in the figures), the striking pin (3) is again an elongated plate body, and the limit section (31) is a key groove formed on the side wall of the striking pin (3). The walls of the key groove include a contact surface and a transition surface, where the contact surface is perpendicular or forms a certain angle with the length direction of the striking pin (3), and the transition surface extends from the side wall of the striking pin (3) to the contact surface. As a preferred embodiment, the transition surface may have a curved shape or an inclined plane structure; alternatively, the transition surface may combine a segment that is parallel to the length direction of the striking pin (3) on a curved or inclined plane structure.

As depicted in FIG. 1, in one embodiment, the motor assembly (5) comprises a motor and a transmission component (e.g., gear box assembly). The motor is a direct current (DC) motor, and a crank arm (51) that can rotate around the axis of the output shaft is fixedly connected to the output shaft of the DC motor. One end of the crank arm (51) is equipped with a crank pin (511), which is used to drive the swing arm (43) to rotate, while the other end of the crank arm (51) is pivotally connected to a connecting rod linked to the second piston (20).

Referring to FIG. 9 to FIG. 13, according to another aspect of this application, an alternative nailing machine is provided, which can also partially address issues related to rapid wear and loosening among connecting components caused by the rigid impact of the crank arm on the braking member.

Figure 9:
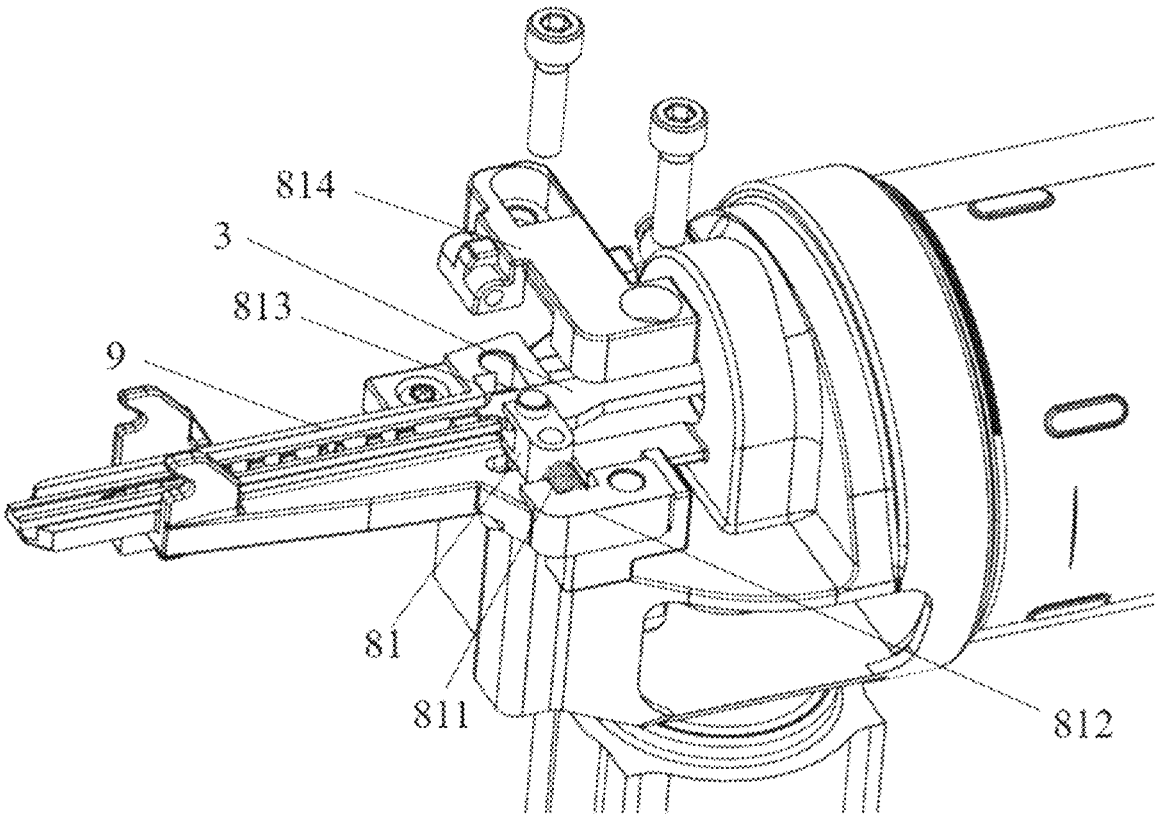
FIG. 9 is a perspective view of the connection structure of another locking mechanism.
Figure 10:
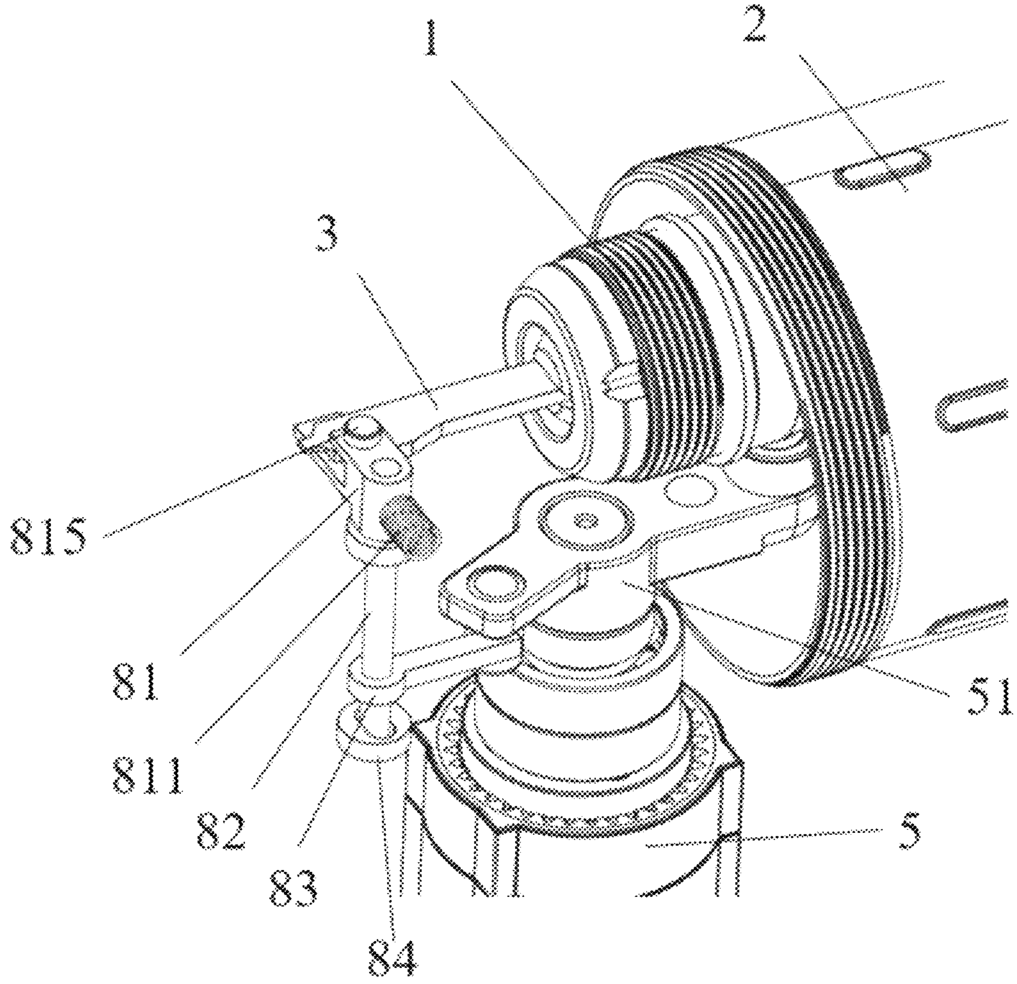
FIG. 10 is a perspective view of a portion of the connection structure of the locking mechanism of FIG. 9.
Figure 11:
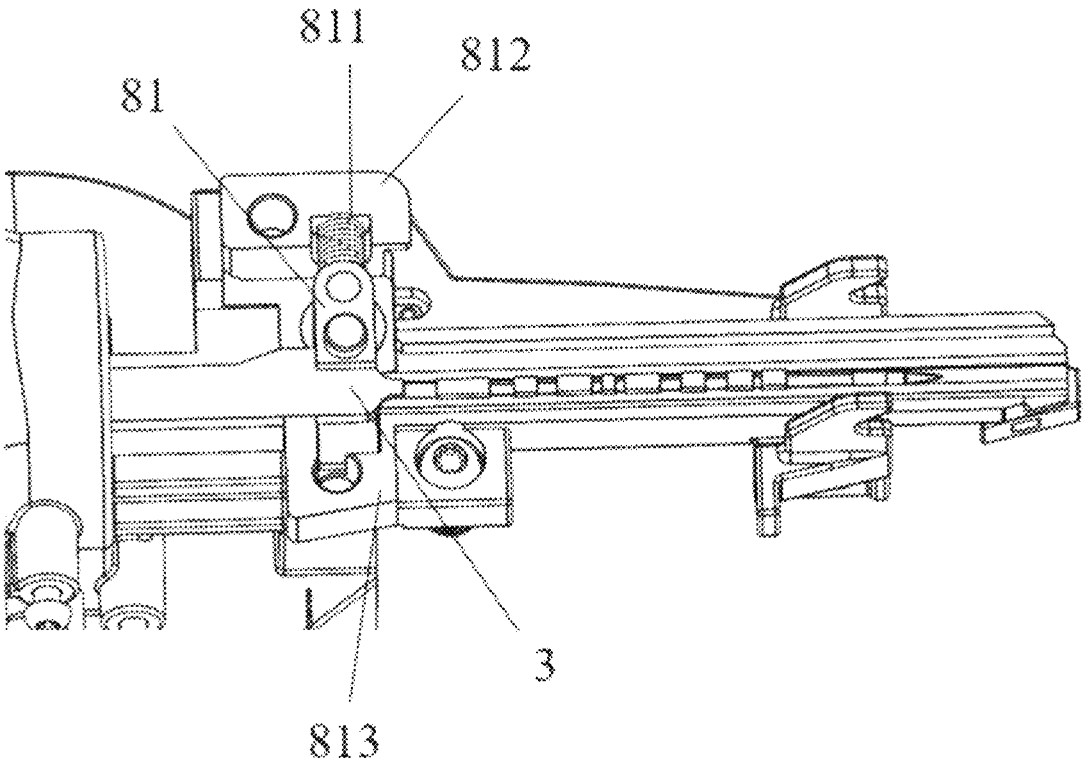
FIG. 11 is a perspective view of the connection structure of the locking mechanism of FIG. 9.
Figure 12:
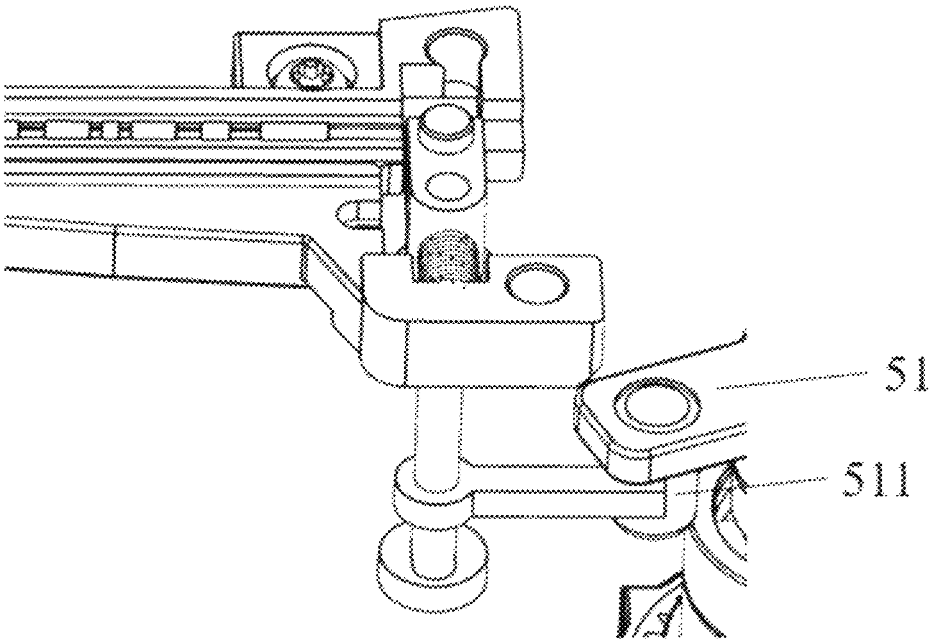
FIG. 12 is a perspective view of a portion of the connection structure of the locking mechanism of FIG. 9.

In this nailing machine, as shown in FIG. 9 to FIG. 10, the nailing machine includes a closed first cylinder (1) and a second cylinder (2) that is enclosed outside the first cylinder (1), with the working chamber of the first cylinder (1) communicating with the working chamber of the second cylinder (2). The first cylinder (1) is equipped with a first piston (10), which is fixedly connected to a striking pin (3), and the striking pin (3) has a limit section (31).

The nailing machine further includes a locking mechanism two (8), which comprises a locking arm two (81), a transmission shaft two (82), and a swing arm two (83). The locking arm two (81) is fixedly connected to the upper part of the transmission shaft two (82), while the swing arm two (83) is fixedly connected to the lower part of the transmission shaft (82). Within the second cylinder (2), there is a second piston (20) that is driven by a motor assembly (5) to reciprocate between a first position and a second position within the second cylinder (2). When the second piston (20) is near the first position, the first piston (10) moves inward and is engaged by the locking arm two (81) at the limit section (31) of the striking pin (3). When the second piston (20) is near the second position, the motor assembly (5) drives the swing arm two (83), the transmission shaft two (82), and the locking arm two (81) away from the striking pin (3) along a direction perpendicular or at a certain angle to the length direction of the striking pin (3), thereby causing the locking arm two (81) to disengage from the limit section (31). The locking arm two (81) is connected with a compression element (811), which enables the end of the locking arm two (81) to press against the side wall of the striking pin (3).

In this embodiment, the compression element (811) serves as an elastic component that can provide a buffering effect when the crank arm impacts the swing arm two (83), thus at least partially preventing rapid wear and loosening among the connecting components. There are no restrictions on the specific structure and material of the compression element (811) as long as it can achieve the aforementioned effects. As a preferred embodiment, the compression element (811) may be a compression spring or compressed rubber.

Furthermore, to ensure effective operation of the compression element (811), as shown in FIG. 9, a compression element baffle (812) is provided on the opposite side of the locking arm (81). The compression element baffle (812) can be integrally formed with the outer casing (7) or installed as a separate component on the outer casing (7).

Figure 13:
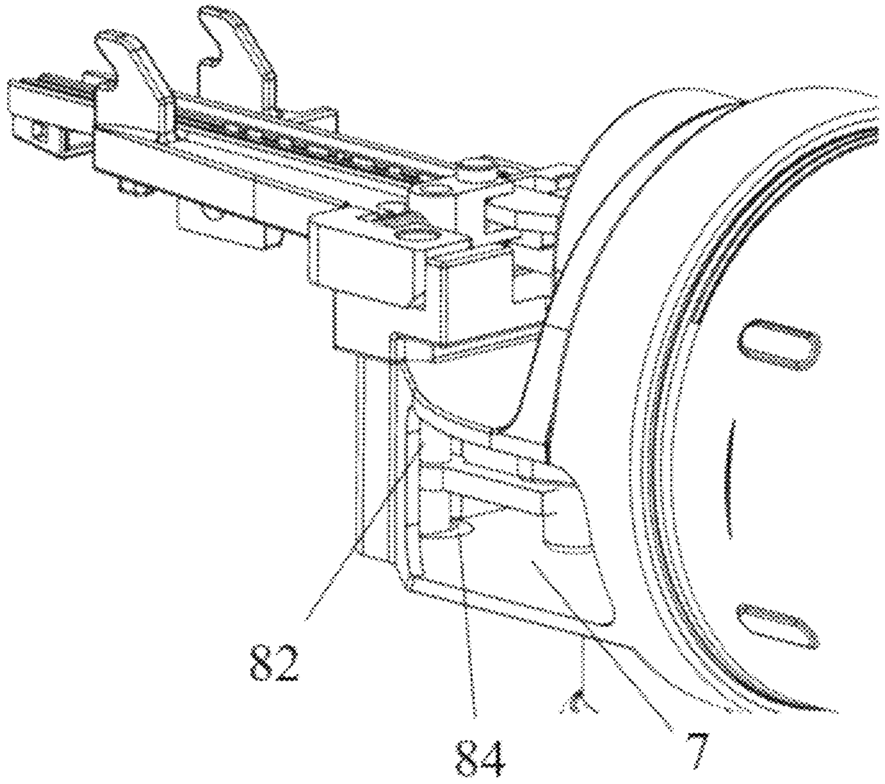
FIG. 13 is a perspective view of the connection structure of the locking mechanism of FIG. 9.

Referring to FIG. 9 to FIG. 13, in one embodiment, the locking arm two (81) moves along an upper track (813), which is oriented perpendicular or at a certain angle to the length direction of the striking pin (3). The bottom of the transmission shaft two (82) moves along a lower track (84), which is parallel to the upper track (813). Specifically, the upper track (813) is set on the outer casing (7) and corresponds to the position of the locking arm (81). Referring to FIG. 10 and FIG. 13, the lower track (84) is also provided on the outer casing (7), with its position corresponding to the bottom position of the transmission shaft two (82). It can be integrally formed with the outer casing (7) or installed as a separate wear-resistant component on the outer casing (7).

In addition, for the other components of this alternative nailing machine, their functionalities and implementations are fundamentally consistent with the corresponding components of the first nailing machine and thus will not be reiterated here.

Moreover, both types of nailing machines include additional components, such as the striking pin track (9) shown in FIG. 7, which serves to protect the striking pin (3). Other structural aspects of the nailing machine can adopt existing technologies, which will not be elaborated further in this application.

The above descriptions of various embodiments of this application are provided for illustrative purposes to a person skilled in the relevant field. They are not intended to exclude or limit the aspects of this application to a single disclosed embodiment. As such, those skilled in the art will understand that there are numerous alternatives and variations of these aspects. Therefore, although several alternative embodiments have been specifically described, a person skilled in the art will readily recognize or easily develop other embodiments. This application encompasses all substitutions, modifications, and variations of the aspects described herein, as well as other embodiments that fall within the spirit and scope of the application as described above.

What is claimed is:

1. A nailing machine comprising:

a closed first cylinder including a first working chamber;

a second cylinder that is enclosed outside the first cylinder the second cylinder including a second working chamber in communication with the first working chamber;

a first piston installed inside the first cylinder;

a striking pin fixedly connected to the first piston, the striking pin having a limiting portion;

locking mechanism including a locking arm a transmission shaft and a swing arm, where the locking arm is connected to an upper part of the transmission shaft, and the swing arm is connected to a lower part of the transmission shaft, with at least one of the locking arm and the swing arm being connected to the transmission shaft in a manner that allows limited rotation therebetween; and a second piston installed within the second cylinder, the second piston driven by a motor assembly to move reciprocally between a first position and a second position, wherein when the second piston is in the first position, the first piston moves inward and the limiting portion is engaged by the locking arm, and wherein when the second piston is in the second position, the motor assembly drives the swing arm to rotate to an angle, disengaging the locking arm from the limiting portion.

2. The nailing machine according to claim 1, wherein the upper and/or lower part of the transmission shaft is provided with a protruding key, and the locking arm and/or swing arm is equipped with a key groove that accommodates the key wherein a size of the key groove is greater than that of the key, allowing the key to rotate a certain angle within the key groove.

3. The nailing machine according to claim 1, wherein the upper and/or lower part of the transmission shaft is provided with a flat position, and the locking arm and/or swing arm is equipped with a flat position groove that accommodates the flat position, wherein a size of the flat position groove is greater than that of the flat position, enabling the flat position to rotate a certain angle within the flat position groove.

4. The nailing machine according to claim 1, wherein the lower part of the transmission shaft axially limits the swing arm on the transmission shaft through a shaft sleeve.

5. The nailing machine according to claim 1, wherein angle is between 5 degrees and 30 degrees.

6. The nailing machine according to claim 5, wherein angle is between 5 degrees and 20 degrees.

7. The nailing machine according to claim 6, wherein angle is 10 degrees.

8. The nailing machine according to claim 1, further comprising an elastic component is connected to the swing arm, the elastic component configured to apply a force to the swing arm, thereby transmitting force through the transmission shaft to the locking arm, so that an end of the locking arm abuts against a side wall of the striking pin.

9. The nailing machine according to claim 8, further comprising a housing in which the elastic component is arranged.

10. The nailing machine according to claim 1, wherein an end of the locking arm is provided with a locking pin configured to engage the limiting portion of the striking pin.

11. The nailing machine according to claim 1, wherein the locking arm is configured as a double-layer structure, capable of accommodating a side wall of the striking pin.

12. The nailing machine according to claim 1, wherein the striking pin is an elongated plate body, and the limiting portion is a projection or groove formed on a side wall of the striking pin.

13. The nailing machine according to claim 12, wherein the side wall of the projection or groove includes a bearing surface and a transition surface, the bearing surface positioned at an angle to a length direction of the striking pin, and the transition surface extends from the side wall of the striking pin to the bearing surface.

14. The nailing machine according to claim 13, wherein the transition surface is either a curved surface or an inclined plane structure.

15. The nailing machine according to claim 13, wherein the transition surface is combined with a segment parallel to the length direction of the striking pin on a curved surface or inclined plane structure.

16. The nailing machine according to claim 13, wherein the bearing surface is positioned perpendicular to a length direction of the striking pin.

17. The nailing machine according to claim 1, wherein the motor assembly includes a motor and a transmission component, wherein the motor is a direct current motor, and an output shaft of the direct current motor is fixedly connected to a crank arm that is rotatable around an axis of the output shaft, and one end of the crank arm is provided with a crank pin to drive the swing arm to rotate while another end of the crank arm is pivotally connected to a connecting rod linked to the second piston.

18. A nailing machine comprising:

a closed first cylinder including a first working chamber;

a second cylinder enclosing the first cylinder, the second cylinder including a second working chamber, the first working chamber of the first cylinder in communication with the second working chamber of the second cylinder;

a first piston positioned in the first cylinder and a striking pin fixedly connected to the first piston, the striking pin including a limiting portion;

a locking mechanism including a locking arm, a transmission shaft, and a swing arm, wherein the locking arm is fixedly connected to an upper part of the transmission shaft and the swing arm is fixedly connected to lower part of the transmission shaft; and a second piston positioned in the second cylinder, the second piston driven by a motor assembly to move reciprocally between a first position and a second position in the second cylinder;

wherein when the second piston is at the first position, the first piston moves inward and the locking arm two engages the limiting portion of the striking pin; and wherein when the second piston is at the second position, the motor assembly drives the swing arm transmission shaft-two and locking arm along a direction at an angle to a length direction of the striking pin, thereby disengaging the locking arm from the limiting portion; and wherein the locking arm is connected to a compressing component, which is capable of making an end of the locking arm abut against a side wall of the striking pin.

19. The nailing machine according to claim 18, wherein the locking arm moves along an upper track, which is at an angle to the length direction of the striking pin, and a bottom of the transmission shaft moves along a lower track, which is parallel to the upper track.

20. A nailing machine comprising:

a first cylinder having a first working chamber;

a first piston positioned inside the first cylinder and movable between a first position and a second position;

a striking pin fixedly connected to the first piston and having a limiting portion;

a locking mechanism including a transmission shaft having an upper part and a lower part, a locking arm coupled to the upper part of the transmission shaft, and a swing arm coupled to the lower part of the transmission shaft; and a motor assembly coupled to the swing arm, the motor assembly rotating the swing arm and thereby, the transmission shaft, and the locking arm to disengage the locking arm from the limiting portion.

* * * * *